US009243941B2

(12) United States Patent
Reichart et al.

(10) Patent No.: US 9,243,941 B2
(45) Date of Patent: Jan. 26, 2016

(54) MAGNETIC-INDUCTIVE FLOWMETER WITH AN EMPTY TUBE DETECTING DEVICE OF AN ADMITTANCE MEASURING TYPE

(71) Applicant: i f m electronic gmbh, Essen (DE)

(72) Inventors: Walter Reichart, Fronreute (DE); Christian Kreisel, Kressbronn (DE); Ralf Kriesen, Amtzell (DE); Markus Körber, Immenstaad (DE); Sebastian Liehr, Wasserburg (DE); Werner Hoch, Tettnang (DE)

(73) Assignee: i f m electronic gmbh, Essen (DE)

( * ) Notice: Subject to any disclaimer, the term of this patent is extended or adjusted under 35 U.S.C. 154(b) by 133 days.

(21) Appl. No.: 13/955,211

(22) Filed: Jul. 31, 2013

(65) Prior Publication Data

US 2014/0033826 A1   Feb. 6, 2014

(30) Foreign Application Priority Data

Jul. 31, 2012   (DE) .......................... 10 2012 015 038

(51) Int. Cl.
*G01F 1/58* (2006.01)
*G01F 1/60* (2006.01)

(52) U.S. Cl.
CPC . *G01F 1/588* (2013.01); *G01F 1/60* (2013.01)

(58) Field of Classification Search
None
See application file for complete search history.

(56) References Cited

U.S. PATENT DOCUMENTS

| 5,503,026 | A |  | 4/1996 | Bohm et al. |
|---|---|---|---|---|
| 6,092,428 | A | * | 7/2000 | Brockhaus ................. 73/861.14 |
| 2005/0183514 | A1 | * | 8/2005 | Huybrechts et al. ....... 73/861.12 |
| 2005/0193833 | A1 | * | 9/2005 | Huybrechts et al. ....... 73/861.12 |
| 2010/0180692 | A1 | * | 7/2010 | Reichart et al. ............ 73/861.11 |

FOREIGN PATENT DOCUMENTS

| DE | 93 16 008 U1 | 2/1994 |
|---|---|---|
| DE | 196 37 716 C1 | 4/1998 |
| DE | 20 2004 009 798 U1 | 10/2004 |
| DE | 10 2009 045 274 A1 | 4/2011 |
| DE | 10 2010 001 993 A1 | 8/2011 |
| DE | 10 2008 027 921 B4 | 11/2011 |
| WO | 2010/066518 A1 | 6/2010 |

* cited by examiner

*Primary Examiner* — Harshad R Patel
(74) *Attorney, Agent, or Firm* — Roberts Mlotkowski Safran & Cole, PC; David S. Safran

(57) ABSTRACT

A magnetic-inductive flowmeter with a nonconductive measuring tube, a magnetic field generating apparatus, two measuring electrodes conductively coupled to the medium for tapping a measuring-circuit voltage induced in the flowing medium, and with a measuring device for detecting an empty tube. Detection of an empty tube is obtained by the measuring device being an admittance measuring device having a detector, a counter-electrode, an ac signal source and an evaluation unit, the detector having an electrode connected to the ac signal source so that the electrode is exposed to an ac signal in the range of roughly 50 MHz-200 MHz and then an electrical field extends from the electrode into the medium. The electrode of the detector and the counter-electrode planiform shaped and are located essentially opposite one another on the outer surface of the measuring tube above and underneath the longitudinal axis of the measuring tube, respectively.

16 Claims, 6 Drawing Sheets

MAGNETIC-INDUCTIVE FLOWMETER WITH AN EMPTY TUBE DETECTING DEVICE OF AN ADMITTANCE MEASURING TYPE

BACKGROUND OF THE INVENTION

1. Field of the Invention

The invention relates to a magnetic-inductive flowmeter for measuring the flow rate of a flowing conductive medium with a measuring tube which consists of a nonconductive material, with a magnetic field generating apparatus for generating an especially changing magnetic field which permeates the measuring tube essentially perpendicular to the longitudinal axis of the measuring tube, with two measuring electrodes which are especially conductively coupled to the medium for tapping a measuring-circuit voltage which has been induced in the flowing medium and with a measuring device for detecting an empty tube, the measuring electrodes being located along a connecting line which runs perpendicular to the longitudinal axis of the measuring tube and perpendicular to the direction of the magnetic field.

2. Description of Related Art

Magnetic-inductive flowmeters whose manner of operation is based on the principle of electromagnetic induction (=Faraday induction) have been known for many years and are extensively used in industrial measurement engineering. According to Faraday's Law, in a flowing medium which entrains charge carriers and which flows through a magnetic field, an electrical field intensity arises perpendicular to the flow direction and perpendicular to the magnetic field. Faraday's Law is used in magnetic-inductive flowmeters in that, by means of a magnetic field generating apparatus which conventionally has two energized magnet coils, a magnetic field is generated which is routed at least partially through the measuring tube, the generated magnetic field having at least one component which runs perpendicular to the flow direction. Within the magnetic field each volumetric element of the flowing medium, which element is moving through the magnetic field and which has a certain number of charge carriers, with the field intensity which arises in this volumetric element contributes to a measuring-circuit voltage which can be tapped via the electrodes.

Since the induced voltage which has been tapped via the electrodes is proportional to the flow velocity of the medium averaged over the cross section of the measuring tube, the volumetric flow can be directly determined from the measured voltage at a known diameter of the measuring tube. The prerequisite for the use of a magnetic-inductive flowmeter is simply a minimum conductivity of the medium. Moreover, it must be ensured that the measuring tube is filled with the medium at least to the extent that the level of the medium is above the measuring electrodes. But since when the measuring tubes are not completely filled, depending on the degree of filling, a considerable measurement error can occur, and magnetic-inductive flowmeters are optimally suitable primarily for applications in which the measuring tube is completely filled. For this reason, magnetic-inductive flowmeters, in practice, generally have a measuring device for detecting an empty tube, which indicates to the user when the degree of filling has dropped so far that the determined measured value can no longer be ascertained with the required accuracy. This can be the case, for example, in a measuring tube which is only two thirds filled so that the measuring devices used in practice for "detecting" an empty tube generate a signal not only when the measuring tube is in fact "empty".

If a magnetic-inductive flowmeter is also to display a measured value when it is not completely filled, the degree of filling must be known so that the measured value can be corrected. These correction values and their determination are discussed for example, in German Patent DE 196 37 716 C1. For this purpose, a test signal voltage is applied to a first pair of electrodes which are opposite one another and a reaction voltage is measured which is caused, in this way, on a second pair of electrodes which are opposite one another, the two electrode pairs being electrically coupled to the medium. Based on the determined ratio between the reaction voltage and the test signal voltage, a correction value is determined, corresponding correction values having been determined empirically beforehand and having been stored in a memory.

The amount of filling of the measuring tube can also be capacitively determined according to German Patent DE 196 55 107 C2 and corresponding U.S. Pat. No. 6,092,428. Here, the two electrodes for measuring the flow rate of the medium are capacitively coupled to the medium, the electrodes with the medium as a dielectric forming a capacitor. Using the two electrodes, on the one hand, the voltage which has been induced in the medium is tapped as a measure for the flow rate of the medium, and on the other hand, the electrodes are exposed to an ac voltage and the capacitance between the electrodes is determined by a control and evaluation circuit as a measure for the proportion of the conductive medium in the measuring tube.

According to German Patent Application DE 10 2009 045 274 A1 a measurement is also enabled for a partially filled measuring tube by a magnetic field generating apparatus being arranged such that the magnetic field which has been generated by it horizontally permeates the measuring tube and there is one electrode in the bottom and the other electrode is located in the top of the measuring tube. The electrode located above the measuring tube has an electrically conductive nonmagnetic extension which is located in the measuring tube and in measurement operation is connected to the medium.

Finally, German Patent Application DE 10 2010 001 993 A1 discloses a magnetic-inductive flowmeter in which, in addition to the magnetic-inductive measuring unit, there is another temperature measuring device which has a metal housing which is in contact with the medium and which is used as an electrode for measuring a minimum conductivity. Depending on the presence of the minimum conductivity, a certain degree of filling is then deduced by an evaluation unit.

In the prior art, in part different measurement principles are combined with one another in order to obtain information about the flow rate and the liquid level. To some extent, the values for the flow rate and liquid level are also determined at different instants. In addition to the problem that the measurement of the flow rate can be influenced by the measurement or the determination of the liquid level, especially when the measuring electrodes which are intended primarily for the flow rate measurement are also included in the measurement, there is also the problem that, for the different measurement principles, the measured value for the liquid level depends on the conductivity of the medium so that it must be known in order to be able to draw a conclusion about the liquid level. Additionally, the measurement of the liquid level can be adversely affected by thin liquid films or conductive adhesions in the region of the measuring device so that it cannot be reliably distinguished whether it is "only" adhesion of the medium or there is a corresponding, relatively high liquid level.

SUMMARY OF THE INVENTION

Therefore, a primary object of the present invention is to devise the type of magnetic-inductive flowmeter that was described at the beginning in its basic structure, and in which the detection of an empty tube or a measurement of the liquid level of the medium in the measuring tube is possible in a manner which is as simple as possible, but still reliable.

In the magnetic-inductive flowmeter in accordance with the invention, this object is achieved in that the measuring device for detecting an empty tube is made as an admittance measuring device which has a detector, a counter-electrode, an ac signal source and an evaluation unit, the detector having an electrode which is connected to the ac signal source so that the electrode can be exposed to an ac signal, the frequency of the ac signal to which the electrode is exposed being in the range of about 50 MHz-200 MHz. The electrode of the detector and the counter-electrode are made planiform and are located essentially opposite one another on the outer surface of the measuring tube, the electrode of the detector being located above and the counter-electrode being located underneath the longitudinal axis of the measuring tube.

The measurement principle of the admittance measuring device is based on the variable liquid level of the medium in the measuring tube influencing the detector, specifically changing the admittance which can be detected by the detector. The detector has an active, triggered electrode, an electrical field extending from the active electrode of the detector into the vicinity, i.e., into the measuring tube. The capacitance of the capacitor which has been formed by the active electrode of the detector, the counter-electrode and the variable vicinity is dependent on the liquid level of the medium to be detected, which medium is located between the electrode and the counter-electrode.

When the electrode of the detector is exposed to an ac signal from the ac signal source, for example, an ac voltage, the measured current, i.e., the charging and discharging current of the measuring capacitance, is dependent on the variable admittance of the detector which is a function specifically of the liquid level of the medium. By measuring the current which is being established, the admittance of the detector can be deduced, and thus, in turn, the liquid level or the change of the liquid level.

The measurement frequency in the flowmeter in accordance with the invention being in the range of 50-200 MHz results in that the measured current, and thus, the measurement signal, are largely independent of the conductivity of the medium so that a change of the conductivity of the medium has hardly any effect on the determined liquid level. Moreover, it has been established that, when using a frequency of the ac signal in the aforementioned high megahertz range, neither conductive adhesions nor thin liquid films on the inside wall of the measuring tube influence the measurement result such that an only partially filled measuring tube with adhesions can be reliably distinguished from a completely or adequately filled measuring tube.

Because the electrode of the detector and the counter-electrode are made planiform, on the one hand, the capacitance between the two electrodes increases, and on the other hand, a high transmitted power can be injected into the medium; this leads to a larger measurement signal to be evaluated. The arrangement of the active electrode, i.e., the electrode of the detector in the upper region of the measuring tube, leads to a steep characteristic of the measurement signal depending on the liquid level so that the measurement signal can be better evaluated. This then leads to the possibility of its being ascertained with high precision whether the liquid level of the medium in the measuring tube has fallen below a given boundary value. Moreover, in this way, a switching point can also be chosen which, even for air bubbles which may form in the flowing medium, enables a reliable measurement signal to be obtained.

When it was stated above that the electrode of the detector is located above and the counter-electrode is located underneath the longitudinal axis of the measuring tube, this should not mean that the two electrodes must be located exactly perpendicular above or underneath the middle axis of the measuring tube. Rather, it is sufficient if the electrode of the detector is located in the upper region of the measuring tube. It is also advantageous if the electrode of the detector is located as much as possible at or in the vicinity of the point of the measuring tube which is the highest point in the installed state.

According to one advantageous configuration of the magnetic-inductive flowmeter in accordance with the invention, the counter-electrode as part of a second detector is connected to a second ac signal source so that a second electrical field extends from the counter-electrode into the medium. In this preferred configuration, thus, both the electrode of the first detector and also the counter-electrode are made as active triggered electrodes so that the two electrodes deliver one measurement signal each. First of all, this has the advantage that, during installation of the magnetic-inductive flowmeter, the user need not watch which of the two electrodes is at the top, since functionally there is no difference between the two detectors. Since the two electrodes are operated as active electrodes, it is ensured that one electrode of a detector is located above the longitudinal axis of the measuring tube.

According to the above described preferred configuration, if the two electrodes are part of a respective detector, the two ac signal sources are preferably connected to a common reference potential, the reference potential being connected directly or via a capacitance to a metallic housing of the magnetic-inductive flowmeter. The shape of the ac signals which have been generated by the ac signal source can be especially sinusoidal or rectangular so that, for example, a square-wave generator can be used as the ac signal source. This square-wave generator can be implemented, for example, by a programmable logic module or a programmable clock module with which several transmitted signals at a time can be set.

If the magnetic-inductive flowmeter has two detectors and also two ac signal sources, it is preferably provided that the two detectors are operated in succession with a different phase. Here, the detectors can be operated both in phase and also in phase opposition, as a result of which either the capacitance or admittance between the electrodes and the vicinity (in-phase operation) or the capacitance or admittance between the electrodes (operation in phase opposition) can be determined. Moreover, the two detectors can also be exposed to one ac signal at a time individually or alternately.

According to another advantageous configuration of the magnetic-inductive flowmeter in accordance with the invention, the first detector is made as a resonator. If the flowmeter has two detectors, preferably also the second detector is made as a resonator. The detector is thus made itself as an oscillatory measuring system; this further improves the ability to distinguish different liquid level states of the medium. The detector which is made as a resonator can also be influenced electrically from the outside, especially the resonant frequency of the resonator being changed by a changing liquid level. The change of the resonant frequency of the resonator results in a change of the amplitude of the measured current when the detector is exposed to the ac signal unchanged; this can likewise be detected by the evaluation unit.

If at least one detector is made as a resonator in the magnetic-inductive flowmeter, the resonator itself is preferably configured such that its resonant frequency is in the megahertz range, especially between 50 and 200 MHz. It is especially advantageous here if the frequency of the ac signal which has been generated by the ac signal source corresponds to the resonant frequency of the resonator, so that the resonator is excited with its resonant frequency; this leads to maximum measurement signals.

If the detector is not made as a resonator, the evaluation of the measurement signal can be carried out, for example, by means of the in-phase and quadrature method (I&Q method) by oversampling or undersampling.

In order to be able to inject the electrical field of the detector or detectors as effectively as possible into the interior of the measuring tube, the measuring tube is made as thin-walled as possible especially in the region of the electrode of the detector and of the counter-electrode. The wall thickness of the measuring tube is less than 5 mm, preferably roughly 2 mm. To ensure sufficient stability and to protect the components located outside of the measuring tube, the measuring tube is surrounded by a support housing which preferably is made of metal. The measuring tube itself is preferably made of high strength plastic. Thermoplastics that are especially suitable for this purpose, are, for example, polyetheretherketone (PEEK), perfluoralkoxyalkane (PFA), polyvinylidene fluoride (PVDF) or polyphenylene sulfide (PPS) or glass-fiber reinforced plastics with a thermoplastic as the base material.

If as stated above the measuring tube is made very thin-walled in the region of the electrode of the detector and of the counter-electrode, there is preferably a respective support body between each of the electrodes which are located on the outer surface of the measuring tube and the inside wall of the support housing which surrounds the measuring tube. The compressive strength of the measuring tube is increased by the arrangement of the support body between the thin-walled region of the measuring tube and the support housing so that the magnetic-inductive flowmeter can be used even at high pressures in spite of the partially very thin-walled measuring tube. The support bodies are made preferably hollow-walled so that coupling of the electrical field of the electrodes as good as possible into the interior of the measuring tube and a decoupling from the external environment as high as possible are achieved. To do this, the support body is preferably made of high strength plastic with a dielectric constant which is as small as possible (DK value).

According to another advantageous configuration of the magnetic-inductive flowmeter in accordance with the invention the electrode and the counter-electrode of the admittance measuring device are spatially separated from the magnetic field generating apparatus and the measuring electrodes for measuring the flow rate of the medium so that mutual influencing of the two measurement systems is as little as possible. Here, the electrode and the counter-electrode of the admittance measuring device, on the one hand, and the magnetic field generating apparatus, on the other, are arranged in succession preferably in the longitudinal direction of the measuring tube.

The measurement signal can be especially easily evaluated by the admittance measuring device having at least one diode ring which is operated as a synchronous rectifier with at least four diodes which are connected serially in succession in the same direction, and the diode ring can be exposed to an ac signal by means of the ac signal source via a first feed point and a second feed point. The first feed point and the second feed point are each connected via two series connected diodes of the diode ring. The detector is connected to the first feed point and the evaluation unit is connected to a first measuring point and/or a second measuring point of the diode ring, the first measuring point and the second measuring point each being connected via a diode of the diode ring to the first feed point and the second feed point.

This configuration of an admittance measuring device is known from German Patent Application DE 10 2008 027 921 B4 to which reference is expressly made here. The diode ring which is operated as a synchronous rectifier and which is connected via the first feed point both to the ac signal source and also to the detector works in two ways. On the one hand, its action results in that one "negative" half wave of the ac signal conductively switches the first diode path of the two which lies between the first feed point and the second feed point. On the other hand, its action results in that the other "positive" half wave of the ac signal conductively switches the second diode path of the diode ring which lies between the first feed point and the second feed point. This means that the measured current in one case can be withdrawn via the first measuring point between the two diodes in the first diode path of the diode ring, and in the other case can be withdrawn via the second measuring point between the two diodes of the second diode path of the diode ring. The measured currents flowing via the two diode paths are the same in a symmetrical structure of the diode ring and can be evaluated separately or together by the evaluation unit.

According to an advantageous configuration of the above described admittance measuring device, there is another resonator, specifically a reference resonator which is connected to the first feed point or to the second feed point, the resonant frequency of the reference resonator preferably being different from the resonant frequency of the detector.

Finally, according to another advantageous configuration of the invention, the evaluation unit is made as a current measuring circuit, the first measuring point of the diode ring being connected to ground via a first capacitor and/or the second measuring point of the diode ring via a second capacitor. Preferably, the maximum currents or the frequency response of the maximum currents are evaluated.

According to the last advantageous configuration of the magnetic-inductive flowmeter in accordance with the invention which will be briefly explained here, the evaluation unit, using at least one measurement signal, makes a threshold value decision and based on the threshold value decision, the evaluation unit outputs a state signal as to whether the liquid level of the medium in the measuring tube is sufficient to take a reliable flow rate measurement. Thus, the evaluation unit does not output or display a specific liquid level, but the user of the magnetic-inductive flowmeter receives only the information which is decisive for him in the measurement of the flow rate, whether the liquid level of the medium in the measuring tube is sufficient to measure a reliable measured value which is subject to a corresponding small measurement error or not.

In particular, at this point there is a host of possibilities for developing and embodying the magnetic-inductive flowmeter in accordance with the invention as will be apparent from the following description of preferred exemplary embodiments in conjunction with the accompanying drawings.

DETAILED DESCRIPTION OF THE INVENTION

Figure 1:
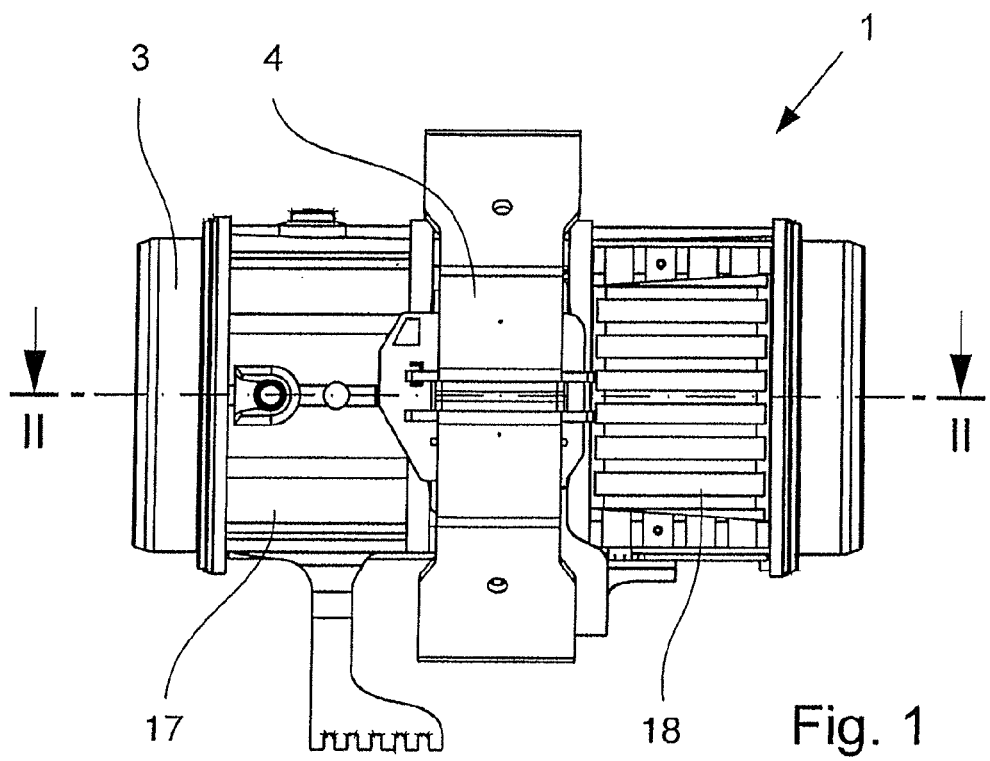
FIG. 1 shows a preferred exemplary embodiment of a magnetic-inductive flowmeter in accordance with the invention, in a side view.
Figure 2:
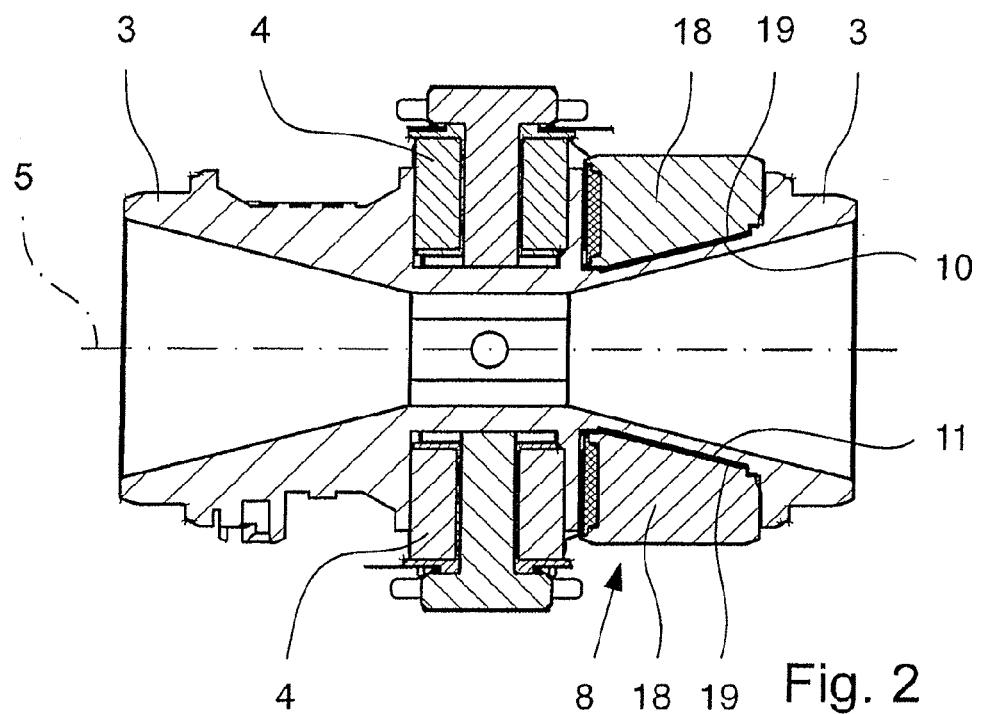
FIG. 2 shows the magnetic-inductive flowmeter according to FIG. 1 in a longitudinal section.
Figure 3:
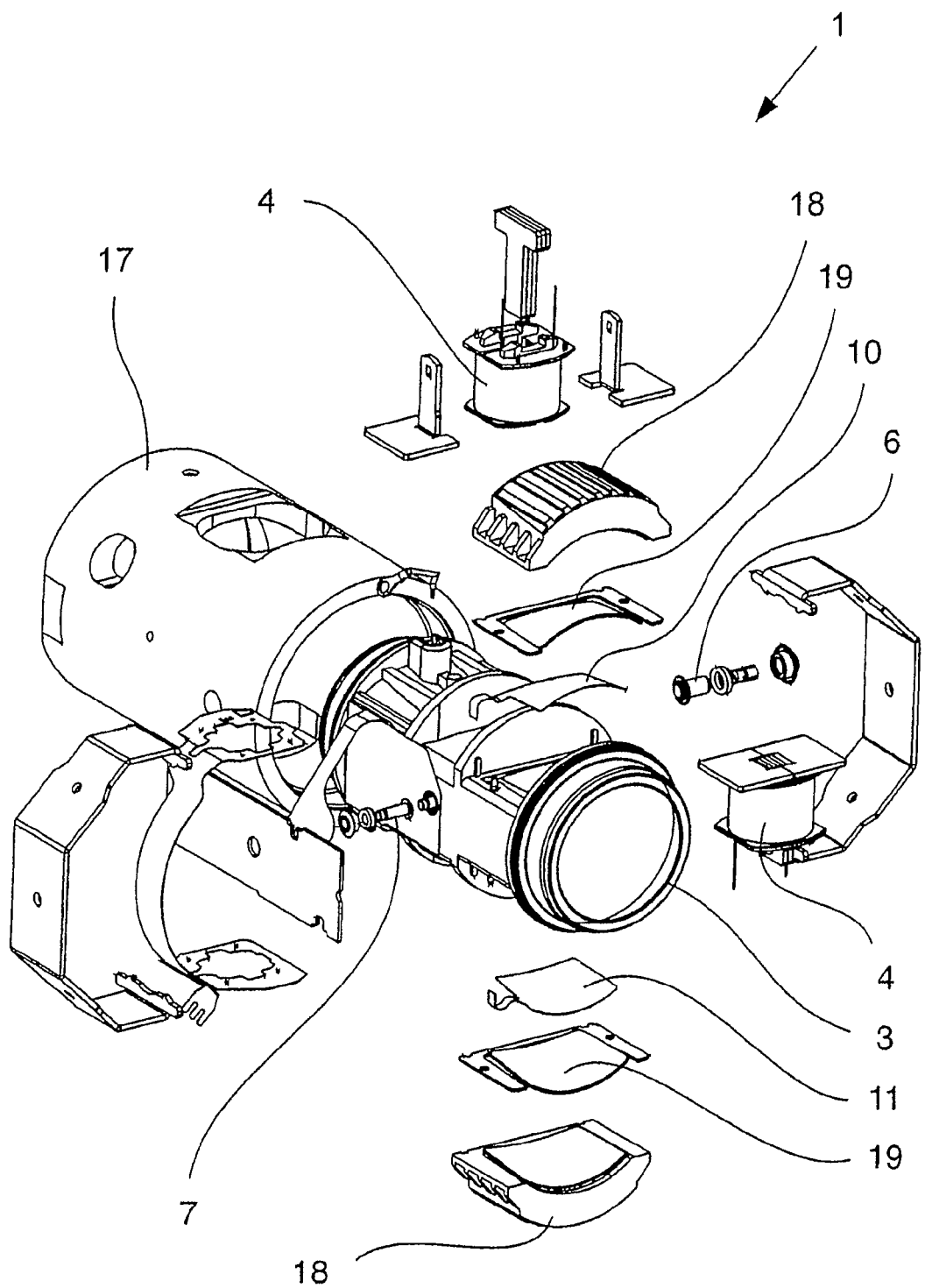
FIG. 3 shows an exploded representation of the magnetic-inductive flowmeter according to FIG. 1.

FIGS. 1 to 3 show a preferred exemplary embodiment of a magnetic-inductive flowmeter 1 in accordance with the invention for measuring the flow rate of a flowing conductive medium 2 in a measuring tube 3. To measure the flow of the medium 2, there is a magnetic field generating apparatus which has two coils 4 which are attached to the outside of the measuring tube 3 on opposite sides and are supplied by a current generator (not shown). The magnetic field generating apparatus and the coils 4 generate a magnetic field which permeates the measuring tube 3 essentially perpendicular to its longitudinal axis 5. Moreover, there are two measuring electrodes 6, 7 which are conductively coupled to the medium 2 and which tap a measuring-circuit voltage which has been induced in the flowing medium 2. In addition to the conductive coupling of the measuring electrodes 6, 7 to the medium 2 provided here, capacitive coupling is also fundamentally possible.

In addition to the above described known measuring device for measuring the flow rate of the flowing medium 2, the magnetic-inductive flowmeter 1 has another measuring device 8 for detecting an empty tube. This measuring device 8 is made as an admittance measuring device and has a detector 9, with an electrode 10, a counter-electrode 11, a first ac signal source 12 and an evaluation unit 13 (which is shown schematically only in FIG. 5).

As is especially apparent from FIGS. 2 and 3, the electrode 10 and the counter-electrode 11 are made planiform and are located opposite one another on the outer surface of the measuring tube 3, the electrode 10 being located above and the counter-electrode 11 being located underneath the longitudinal axis 5 of the measuring tube 3.

Figure 4:
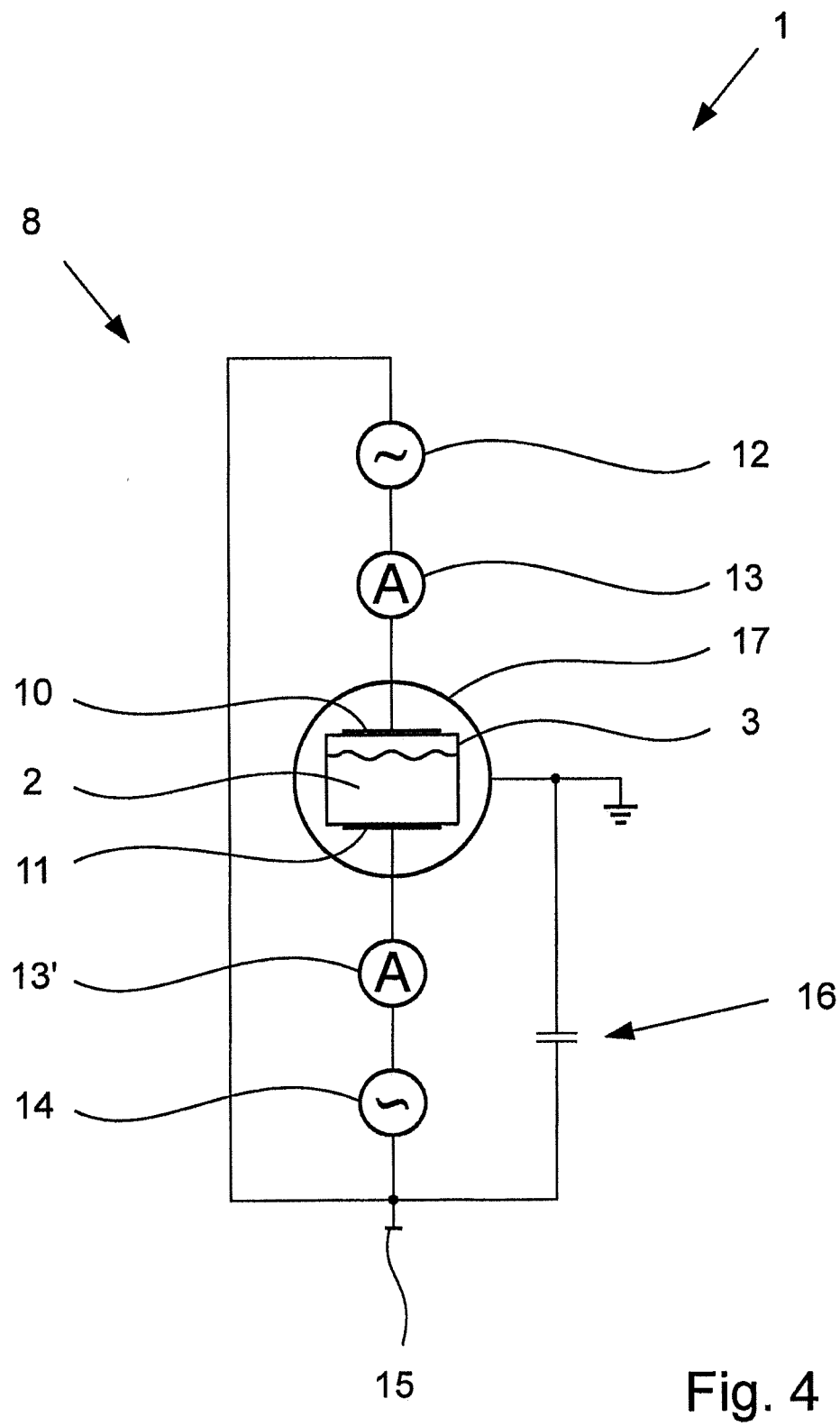
FIG. 4 is a schematic diagram of the exemplary embodiment of the admittance measuring device of the flowmeter according to FIG. 1, FIGS. 5a and 5b show circuit diagrams of exemplary embodiments of an admittance measuring device

In the preferred configuration of the magnetic-inductive flowmeter 1 in accordance with the invention, which is shown in FIGS. 1 to 3, not only is the electrode 10 connected to a first ac signal source 12, but also the counter-electrode 11 is connected to a second ac signal source 14 so that the two electrodes 10, 11 are operated as active electrodes which are triggered by the respective ac signal sources 12, 14. As is apparent from FIG. 4, the two ac signal sources 12, 14 are connected to a common reference potential 15 which is connected via a capacitance 16 to the outer metallic support housing 17 of the magnetic-inductive flowmeter 1.

Since the measuring tube 3, which is made of a thermoplastic, especially polyetheretherketone (PEEK), in the region of the electrodes 10, 11 has only a very small wall thickness of a few millimeters, preferably roughly 2 to 3 mm, to ensure sufficient compressive strength of the measuring tube 3, between the electrodes 10, 11 and the inner wall of the support housing 17, there is a respective hollow-walled support body 18 for each. To protect the thin planiform electrodes 10, 11 against damage, between the electrodes 10, 11 and the support bodies 18 there is also a protective mat 19 of an elastic material, for example, rubber. Due to the arrangement of the support bodies 18, which are preferably made of the same or a similar material as the measuring tube 3, not only is the mechanical stability of the measuring tube 3 increased, but also the coupling of the electrical field emitted by the electrodes 10, 11 into the medium 2 is increased. The hollow-walled support body 18 can be made, for example, honeycombed for this purpose.

FIGS. 2 and 3 also show that the electrode 10 and the opposite counter-electrode 11 are spatially separated from the two coils 4 of the magnetic field generating apparatus and the measuring electrodes 6, 7 such that the electrodes 10, 11, on the one hand, and the coils 4 as well as the measuring electrodes 6, 7, on the other hand, are located in succession in the longitudinal direction of the measuring tube 3.

Figure 5A:
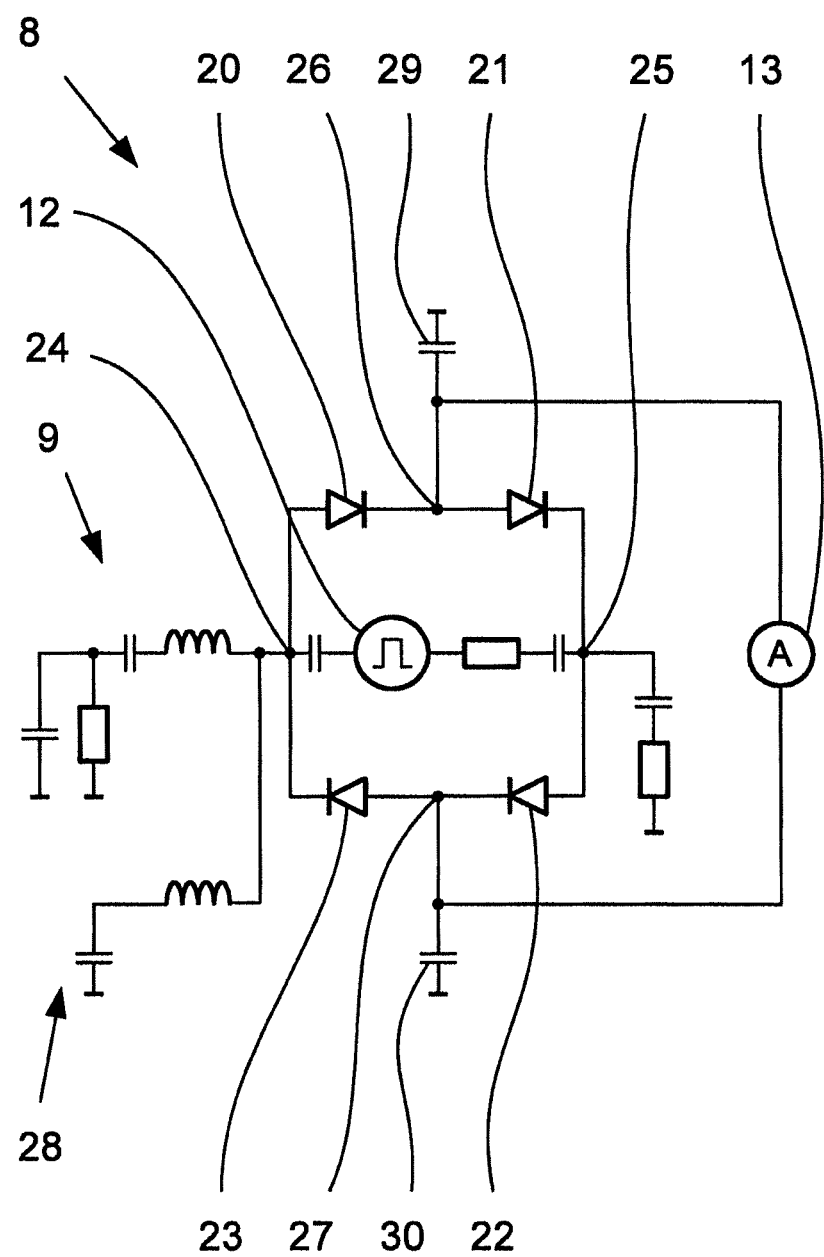

FIG. 5a shows a preferred exemplary circuit engineering embodiment of the admittance measuring device 8, in this schematic representation only the evaluation circuit for the first detector 9 being shown. When the counter-electrode 11 (FIG. 4) is part of a second detector 9' and is connected to a second ac signal source 14, the measurement signal of the second detector is evaluated according to the evaluation of the measurement signal of the first detector 9, which evaluation is described below and is shown in FIG. 5b.

The admittance measuring device 8 has a diode ring which is operated as a synchronous rectifier with four diodes 20, 21, 22, 23 which are connected in series and in the same direction in succession, the detector 9 and an evaluation unit 13. The diode ring can be exposed to an ac signal by means of the ac signal source 12 via a first feed point 24 and a second feed point 25, the ac signal preferably having a rectangular signal shape. The first feed point 24 is on the connection between the anode of the first diode 20 and the cathode of the fourth diode 23, while the second feed point 25 is on the connection between the cathode of the second diode 21 and the anode of the third diode 22. The two feed points 24, 25 thus divide the diode ring into two diode paths, the first diode path allowing current to be carried via the first diode 20 and the second diode 21 and the second diode path allowing current to be carried via the third diode 22 and the fourth diode 23. Depending on the polarity of the voltage which has been generated by the ac signal source 12, either the first path of the diode ring or the second path of the diode ring is conductively switched.

Figure 5B:
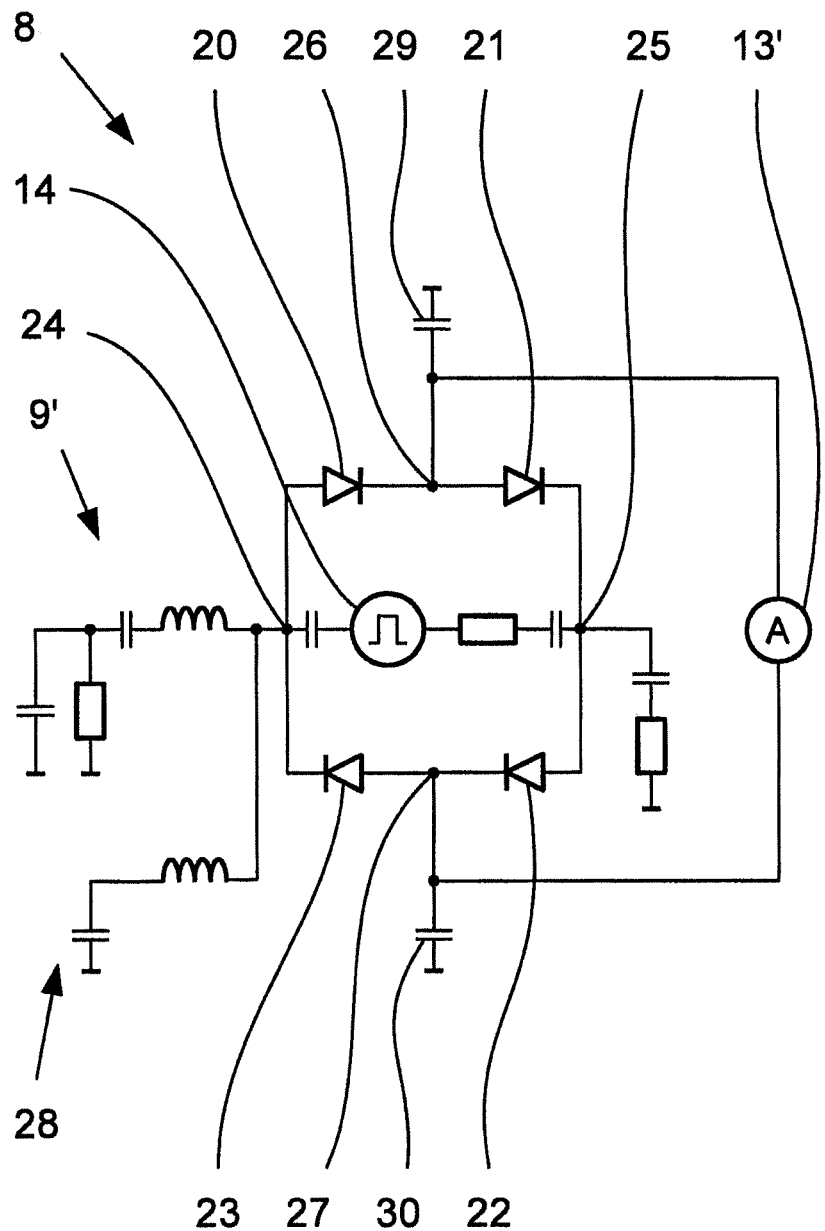

As FIGS. 5a, 5b also show the detector 9, 9' is connected to the first feed point 24 of the diode ring and the evaluation unit 13, 13' is connected to the first measuring point 26 and in addition to a second measuring point 27 of the diode ring. The two measuring points 26, 27 are each spaced apart via one diode of the diode ring from the first feed point 24 and the second feed point 25. In addition to the first detector 9 which is made as a resonator, the admittance measuring device 8 moreover has another reference resonator 28 which is connected here to the first feed point 24 of the diode ring.

In the exemplary embodiment which is shown in FIGS. 5a, 5b, the evaluation unit 13, 13' is made as a current measuring circuit, the first measuring point 26 of the diode ring being connected to the circuit ground via a first capacitor 29. Moreover, the second measuring point 27 of the diode ring is likewise connected to ground via a second capacitor 30 so that the resonator currents which are flowing via the two paths of the diode ring charge the two capacitors 29, 30.

Figure 6:
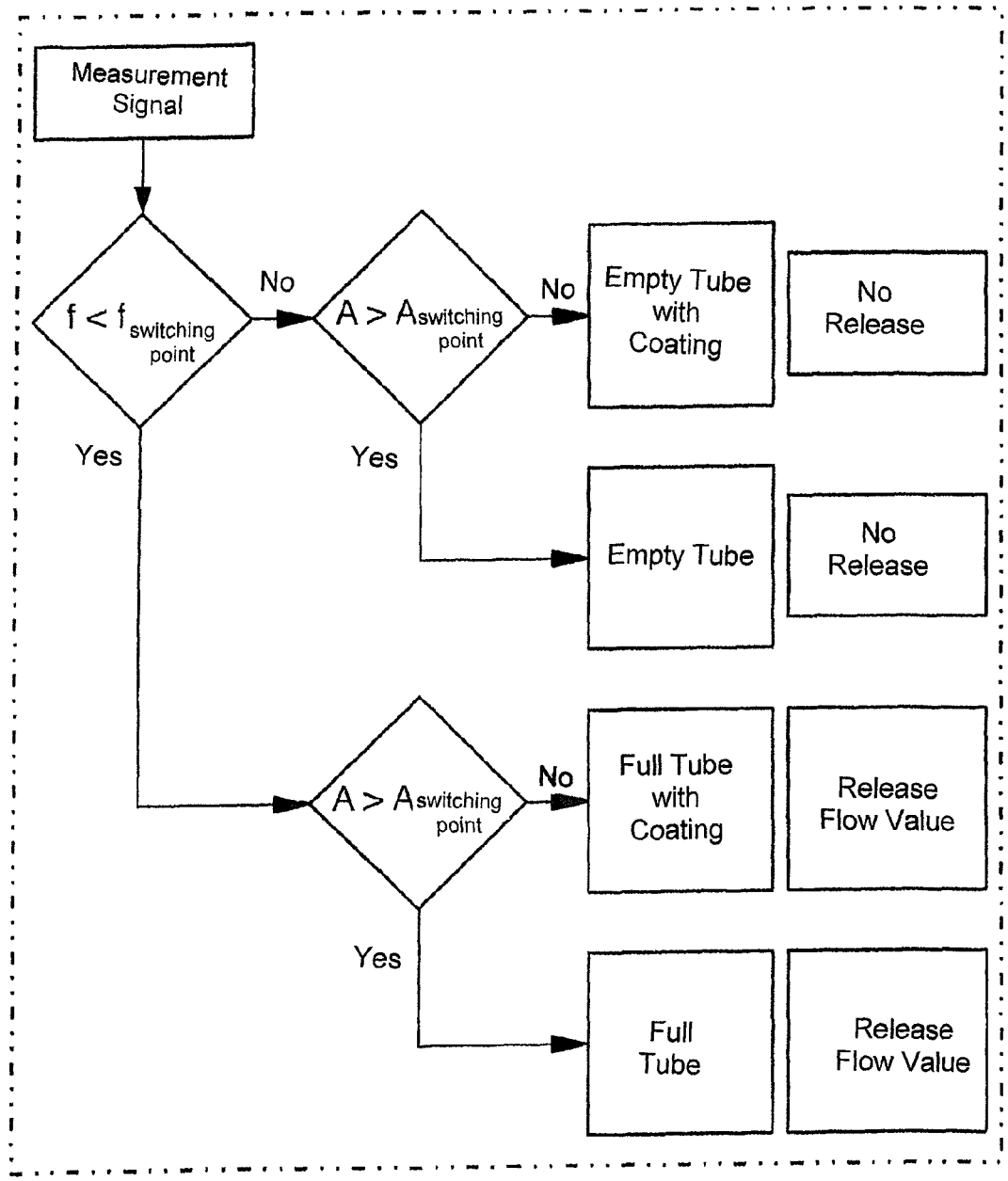
FIG. 6 is a flow chart of the evaluation of the measurement signal of the admittance measuring device.

FIG. 6 shows a flow chart of the evaluation unit. If the resonator frequency of the detector acquired by the evaluation unit is smaller than a given boundary frequency and the amplitude of the measurement signal is greater than a lower boundary value, this means that the measuring tube is completely filled with the medium or in any case the liquid level height of the medium is sufficient to take a reliable flow rate measurement. If the resonant frequency of the detector is smaller than a given boundary frequency, but the amplitude of the measurement signal is smaller than a lower boundary value, this means that the measuring tube is indeed filled, but at the same time there is a coating on the inside wall of the measuring tube because, for example, the medium has been changed and there are still adhesions of a previous, adherent medium. But, in this case, a reliable flow rate measurement is also possible.

If the resonator frequency of the measurement signal is conversely greater than the boundary frequency, first of all, this means that the liquid level of the medium in the measuring tube is smaller than a lower boundary value. If the amplitude of the measurement signal is smaller than a lower boundary value, there are adhesions on the inside wall of the measuring tube, while when the amplitude is greater than a lower boundary value, the measuring tube is empty, In both cases a reliable flow rate measurement is not possible; this can be indicated to the user by a corresponding warning signal.

With the magnetic-inductive flowmeter 1 in accordance with the invention, it can be reliably recognized whether the liquid level of a medium 2 which is flowing through the measuring tube 3 is high enough so that a reliable flow rate measurement can be taken. Nor is the implemented empty tube detection adversely affected by thin liquid films or conductive adhesions in the region of the measuring device. By the arrangement and configuration of the electrodes 10, 11 and the use of a high measurement frequency in the megahertz range preferably between 50 and 200 MHz, a switching point can be chosen which even for air bubbles which may form in the flowing medium 2 enables a reliable state signal which indicates whether the liquid level of the medium 2 is sufficient to take a reliable flow rate measurement.

What is claimed is:

1. A magnetic-inductive flowmeter for measuring the flow rate of a flowing conductive medium, comprising:
a measuring tube made of a nonconductive material,
a magnetic field generating apparatus for generating a magnetic field which permeates the measuring tube essentially perpendicular to a longitudinal axis of the measuring tube,
two measuring electrodes which are conductively or capacitively coupled to the medium for tapping a measuring-circuit voltage which has been induced in the flowing medium, the measuring electrodes being located along a connecting line which runs perpendicular to the longitudinal axis of the measuring tube and perpendicular to the direction of the magnetic field, and
a measuring device for detecting an empty tube,
wherein the measuring device for detecting an empty tube is an admittance measuring device which has at least one detector, a counter-electrode, at least one AC signal source and an evaluation unit,
wherein the at least one detector has an electrode which is connected to the AC signal source to expose the electrode to an AC signal for extending an electrical field from the electrode into the medium, the frequency of the AC signal to which the electrode is exposed being in a range of about 50 MHz-200 MHz, and
wherein the electrode of the at least one detector and the counter-electrode have a planiform shape and are located essentially opposite one another on an outer surface of the measuring tube, the electrode of the detector being located above the longitudinal axis of the measuring tube and the counter-electrode being located underneath the longitudinal axis of the measuring tube.

2. The magnetic-inductive flowmeter in accordance with claim 1, wherein said at least one detector comprises a first detector and a second detector, wherein the at least one AC signal source comprises a first AC signal source and a second AC signal source, wherein the first detector is connected to the first AC signal source and wherein the counter-electrode is part of the second detector and is connected to the second AC signal source so that a second electrical field extends from the counter-electrode into the medium.

3. The magnetic-inductive flowmeter in accordance with claim 2, wherein each of the first detector and the second detector is a resonator.

4. The magnetic-inductive flowmeter in accordance with claim 3, wherein the resonant frequency of the detectors is in the megahertz range between 50 and 200 MHz.

5. The magnetic-inductive flowmeter in accordance with claim 2, wherein the first and second AC signal sources are connected to a common reference potential.

6. The magnetic-inductive flowmeter in accordance with claim 2, wherein the first detector and the second detector are operable in succession with a different phase.

7. The magnetic-inductive flowmeter in accordance with claim 1, wherein the at least one detector comprises a resonator.

8. The magnetic-inductive flowmeter in accordance with claim 1, wherein the measuring tube is thin-walled at least in a region of the electrode of the at least one detector and of the counter-electrode, having a wall thickness of less than 5 mm.

9. The magnetic-inductive flowmeter in accordance with claim 1, wherein the measurement tube is made of a material selected from the group consisting of polyetheretherketone (PEEK), perfluoralkoxyalkane (PFA), polyvinylidene fluoride (PVDF), polyphenylene sulfide (PPS), and of glass-fiber reinforced plastic.

10. The magnetic-inductive flowmeter in accordance with claim 1, wherein the measuring tube is surrounded by a metal support housing and wherein a support body is provided between the electrode of the detector and an inside wall of the support housing and a support body is provided between the counter-electrode and the inside wall of the support housing.

11. The magnetic-inductive flowmeter in accordance with claim 10, wherein the support bodies are hollow-walled and are made of the same material as the measuring tube.

12. The magnetic-inductive flowmeter in accordance with claim 1, wherein the electrode and the counter-electrode of the admittance measuring device are spatially separated from the magnetic field generating apparatus and the measuring electrodes, the electrode and the counter-electrode on one hand and the magnetic field generating apparatus on the other being arranged in series in a longitudinal direction of the measuring tube.

13. The magnetic-inductive flowmeter in accordance with claim 1, wherein the admittance measuring device comprises at least one diode ring which operates as a synchronous rectifier with at least four diodes which are connected in series, in the same direction in succession, wherein the diode ring is exposed to an AC signal by means of the at least one AC signal source via a first feed point and a second feed point, wherein the first feed point and the second feed point are connected via a respective two series connected diodes of the diode ring, wherein the at least one detector is connected to the first feed point and the evaluation unit is connected to at least one of a first measurement point of the diode ring and a second measurement point of the diode ring, and wherein the first measurement point and the second measurement point are each connected via a respective diode of the diode ring to the first feed point and the second feed point.

14. The magnetic-inductive flowmeter in accordance with claim 13, wherein the admittance measuring device has at least one reference resonator which is connected to one of the first feed point and the second feed point, the resonant frequency of the reference resonator being different from the resonant frequency of the detector.

15. The magnetic-inductive flowmeter in accordance with claim 13, wherein the evaluation unit comprises a current measuring circuit, the first measuring point of the diode ring being connected to ground via at least one of a first capacitor and the second measuring point of the diode ring via a second capacitor.

16. The magnetic-inductive flowmeter in accordance with claim 1, wherein the evaluation unit is adapted to make a threshold value decision based on at least one measurement signal and to output a state signal as to whether the liquid level of the medium is sufficient to take a reliable flow rate measurement.

\* \* \* \* \*